United States Patent
Miossec et al.

(10) Patent No.: US 12,429,015 B2
(45) Date of Patent: Sep. 30, 2025

(54) ASSEMBLY FOR AN EJECTION CONE OF AN AIRCRAFT TURBOMACHINE

(71) Applicant: SAFRAN NACELLES, Gonfreville-L'Orcher (FR)

(72) Inventors: Tony Miossec, Moissy-Cramayel (FR); Fabien Bravin, Moissy-Cramayel (FR); Vincent Devanlay, Moissy-Cramayel (FR); Marc Versaevel, Moissy-Cramayel (FR); Valentin Simeon, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/714,334

(22) PCT Filed: Dec. 2, 2022

(86) PCT No.: PCT/FR2022/052220
§ 371 (c)(1),
(2) Date: May 29, 2024

(87) PCT Pub. No.: WO2023/099852
PCT Pub. Date: Jun. 8, 2023

(65) Prior Publication Data
US 2025/0019081 A1   Jan. 16, 2025

(30) Foreign Application Priority Data
Dec. 3, 2021   (FR) ........................... 2112892

(51) Int. Cl.
*F02K 1/82* (2006.01)
*B64D 27/10* (2006.01)
(Continued)

(52) U.S. Cl.
CPC .............. *F02K 1/827* (2013.01); *B64D 27/10* (2013.01); *F01D 25/30* (2013.01); *F02C 7/24* (2013.01);
(Continued)

(58) Field of Classification Search
CPC ..... F02K 1/04; F02K 1/40; F02K 1/44; F02K 1/82; F02K 1/827; F01D 25/30; F05D 2260/96; F05D 2270/333; F02C 7/24
See application file for complete search history.

(56) References Cited

U.S. PATENT DOCUMENTS 9,303,588 B2 * 4/2016 Pongratz ................... F02C 7/24
2020/0062424 A1 * 2/2020 Hubert-Choinard .... B29C 33/52

FOREIGN PATENT DOCUMENTS

| EP | 3 624 111 A1 | 3/2020 |
| EP | 3 839 238 A1 | 6/2021 |
| WO | WO 2013/121155 A1 | 8/2013 |

OTHER PUBLICATIONS

International Search Report Issued Mar. 30, 2023, in PCT/FR2022/052220, filed on Dec. 2, 2022, 3 pages.

* cited by examiner

*Primary Examiner* — Kyle Robert Thomas
(74) *Attorney, Agent, or Firm* — Oblon, McClelland, Maier &Neustadt, L.L.P.

(57) ABSTRACT

An assembly for an ejection cone of an aircraft turbomachine, including a first annular wall and a plurality of first partitions and of second partitions extending substantially perpendicularly from the first wall, the first partitions additionally extending wholly in the axial direction and the second partitions extending wholly in a circumferential direction between the adjacent pairs of first partitions and being curved partitions including at least one arcuate portion in the axial direction upstream or downstream, the first wall, (Continued)

the first partitions and the second partitions additionally defining between them a plurality of acoustic boxes distributed around the first wall.

9 Claims, 8 Drawing Sheets

(51) Int. Cl.
 *F01D 25/30* (2006.01)
 *F02C 7/24* (2006.01)
 *F02K 1/04* (2006.01)
 *F02K 1/40* (2006.01)
(52) U.S. Cl.
 CPC ................ *F02K 1/04* (2013.01); *F02K 1/40* (2013.01); *F02K 1/82* (2013.01)

ASSEMBLY FOR AN EJECTION CONE OF AN AIRCRAFT TURBOMACHINE

TECHNICAL FIELD

The invention relates to a set for an ejection cone of an aircraft turbomachine, an ejection cone for an aircraft turbomachine comprising such a set, as well as a turbomachine for aircraft comprising such an ejection cone.

STATE OF PRIOR ART

Conventionally, an aircraft turbomachine comprises, from upstream to downstream in the direction of flow of the gases in an axial direction, a fan, a low-pressure compressor, a high-pressure compressor, a combustion chamber, a high-pressure turbine, a low-pressure turbine and an exhaust nozzle comprising an exhaust casing and an ejection cone connected, upstream, to the exhaust casing.

This ejection cone comprises an annular upstream part fitted with acoustic enclosures for abating the noise produced by the combustion of the gases and/or the rotation of the various turbine stages and propagating along the turbomachine, as well as a conical downstream part. These acoustic enclosures are formed by a radially inner first annular wall, a radially outer second annular wall and by straight partitions extending generally radially between the first and second walls and defining therebetween a honeycomb cellular structure. The partitions are furthermore assembled by soldering to the first wall. The acoustic enclosures thus formed have small dimensions and a small volume, especially in the order of 1 $cm^3$ to 2 $cm^3$.

However, the implementation of such acoustic enclosures is not always adapted. For example, it is not very well adapted to absorbing low-frequency noise, which is the case with combustion noise. Moreover, the attachment by soldering provided between the partitions and the first wall is not adapted to all types of material, such as ceramic matrix composite materials. It is also not adapted to the use of different materials for the partitions and the first and second walls and to the absorption of forces generated by differential thermal expansion between the partitions and the first and second walls due to the use of such different materials.

DISCLOSURE OF THE INVENTION

The aim of the present invention is to overcome the above-mentioned problems.

To this end, one object of the invention is a set for an ejection cone of an aircraft turbomachine, comprising a first annular wall centred on a longitudinal axis of axial direction oriented from upstream to downstream, a plurality of first partitions and second partitions extending substantially perpendicularly from the first wall, wherein the first partitions extend generally in the axial direction and are distributed circumferentially around the first wall, wherein the second partitions extend generally in a circumferential direction between the pairs of adjacent first partitions and are distributed circumferentially around the annular wall in at least one circumferential row, and wherein the first wall, the first partitions and the second partitions define therebetween a plurality of acoustic enclosures distributed around the first wall.

According to a first aspect of the invention, the second partitions are bent partitions comprising at least one portion arched in the axial direction upstream or downstream.

According to alternative embodiments of this first aspect of the invention which can be taken together or individually:
the arched portions of the second partitions of at least one of the circumferential rows define a pattern repeating along said circumferential row and the pattern of the arched portions of the second partitions of said circumferential row consists of a portion arched upstream or downstream, such that all the arched portions of the second partitions of said circumferential row are oriented in the same axial direction, upstream or downstream;
the arched portions of the second partitions of at least one of the circumferential rows define a pattern repeating along said circumferential row and the pattern of the arched portions of the second partitions of said circumferential row consists of a portion arched upstream followed by a portion arched downstream, so as to obtain an alternation of a portion arched upstream and a portion arched downstream all along said circumferential row;
the arched portions of the second partitions of at least one of the circumferential rows define a pattern repeating along said circumferential row and the pattern of the arched portions of the second partitions of said circumferential row consists of two portions arched upstream followed by two portions arched downstream, so as to obtain an alternation of two portions arched upstream and two portions arched downstream along said circumferential row;
along at least one of the circumferential rows, two or more successive arched portions are interposed between each pair of adjacent first partitions;
each second partition of at least one of the circumferential rows carries a single arched portion;
each second partition of at least one of the circumferential rows carries a portion arched upstream and a portion arched downstream;

According to a second aspect of the invention, which may or may not be combined with the first aspect, an assembly formed by the first and second partitions is attached to the first wall by means of first attachment members arranged upstream and second attachment members arranged downstream, and in that the first attachment members are offset circumferentially relative to the second attachment members.

According to alternative embodiments of this second aspect of the invention which can be taken together or individually:
the first attachment members are mounted between second partitions of the most upstream circumferential row and an upstream portion of the first wall;
the first attachment members are mounted on one side only, on the downstream side, of said second partitions in the axial direction;
each first attachment member is separated from the first attachment members which are circumferentially adjacent thereto, by one or two first partitions;
the first attachment members are mounted between first partitions and an upstream portion of the first wall;
the first attachment members are mounted upstream of the circumferential rows of second partitions;
the first attachment members are mounted on each side of said first partitions in the circumferential direction;
the second attachment members are mounted between the first partitions and a downstream portion of the first wall downstream of the circumferential rows of second partitions;

the second attachment members are mounted on either side of said first partitions in the circumferential direction;

each second attachment member is mounted on a single side of said first partitions in the circumferential direction, facing another second attachment member.

Another object of the invention is an ejection cone for an aircraft turbomachine comprising a set as previously described.

One object of the invention is also a turbomachine for aircraft, comprising an ejection cone as previously described.

BRIEF DESCRIPTION OF THE DRAWINGS

Further aspects, purposes, advantages and characteristics of the invention will become clearer upon reading the following detailed description of preferred embodiments thereof, given by way of non-limiting example, and made with reference to the annexed drawings in which.

DETAILED DESCRIPTION

Figure 1:
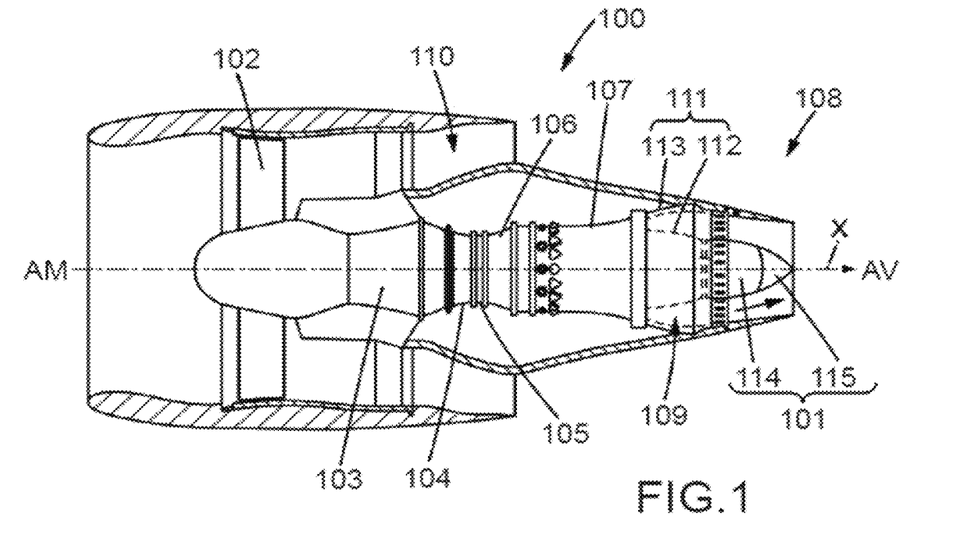
FIG. 1 is a schematic view, in longitudinal section, of a turbomachine comprising an ejection cone provided with a set according to one embodiment of the invention.

FIG. 1 shows a turbomachine 100 for aircraft comprising an ejection cone 101 provided with a set 10 according to one embodiment of the invention. The ejection cone 101 is shown in more detail in FIGS. 2 and 3.

As a preliminary basis, an axial direction, a radial direction which is orthogonal to the axial direction and a circumferential direction which is orthogonal to the axial and radial directions are defined.

The turbomachine 100 extends along a longitudinal axis X of axial direction and comprises, from upstream AM to downstream AV in the direction of flow of the gases in the axial direction, a fan 102, a low-pressure compressor 103, a high-pressure compressor 104, a combustion chamber 105, a high-pressure turbine 106, a low-pressure turbine 107 and an exhaust nozzle 108 comprising especially the ejection cone 101.

The turbomachine 100 furthermore comprises, downstream of the fan 102, an annular primary flux flow channel 109, called the primary stream, along which a primary gas flux circulates and passes through the low-pressure compressor 103, the high-pressure compressor 104, the combustion chamber 105, the high-pressure turbine 106 and the low-pressure turbine 107, and an annular secondary flux flow channel 110, called the secondary stream, surrounding the primary stream 109 and along which a secondary gas flux circulates. The primary and secondary gas fluxes mix at the exhaust nozzle 108.

The turbomachine 100 also comprises, downstream of the low-pressure turbine 107 and upstream of the exhaust nozzle 108, an exhaust casing 111 comprising a radially inner shell 112 and a radially outer shell 113 defining an annular space forming, downstream of the low-pressure turbine 107, part of the primary stream 109.

The ejection cone 101 comprises, for example, an annular upstream part 114 connected to the radially inner shell 112 of the exhaust casing 111 and comprising the set 10 according to the invention, and a conical downstream part 115 connected to the upstream part 114.

The set 10 according to the invention is shown in more detail in FIGS. 2 to 14. It comprises a first annular wall 11, first partitions 12 and second partitions 13.

Figure 4:
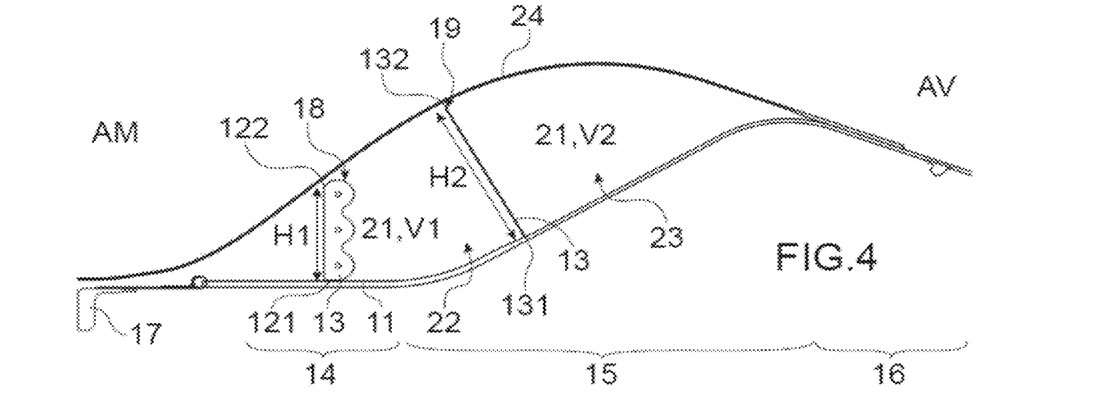
FIG. 4 is a partial view, in longitudinal section, of the ejection cone illustrated in FIGS. 2 and 3.

The first wall 11 is centred on the longitudinal axis X. The first wall 11 may have, from upstream AM to downstream AV, a first generally cylindrical portion 14, a second generally frustoconical portion 15 diverging downstream AV and a third generally frustoconical portion 16 converging downstream AV (FIG. 4). The first wall 11 can furthermore be attached, upstream, to the radially inner shell 112 of the exhaust casing 111, especially via an upstream end 17 of its first portion 14. The first wall 11 can also be attached, downstream, to the downstream part 115 of the ejection cone 101. The first wall 11 is for example made of a ceramic matrix composite material. More generally, it can be made with any type of material capable of withstanding temperatures of 450° C. or more.

Figure 3:
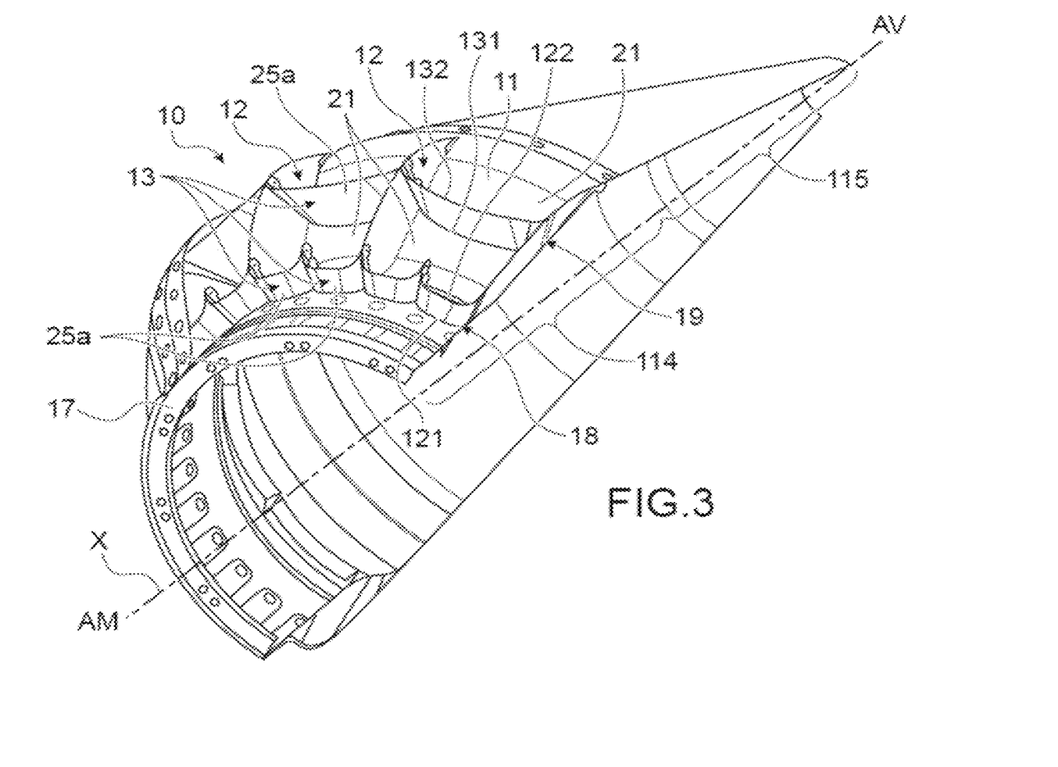
FIG. 3 is a partial view, in perspective, of the ejection cone illustrated in FIG. 2.
Figure 5:
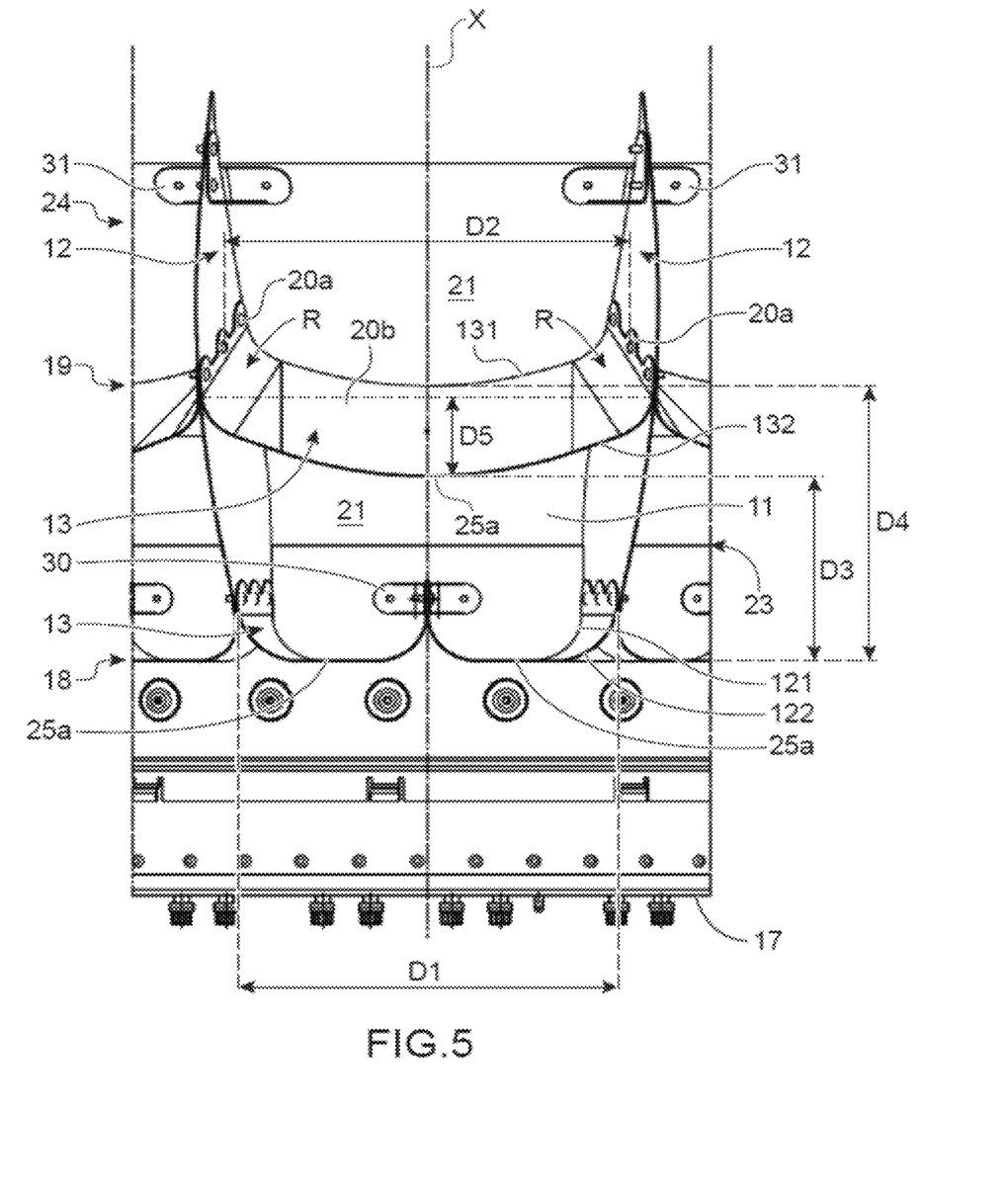
FIG. 5 is a partial view radially outwards of the ejection cone illustrated in FIGS. 2 to 4.
Figure 6:
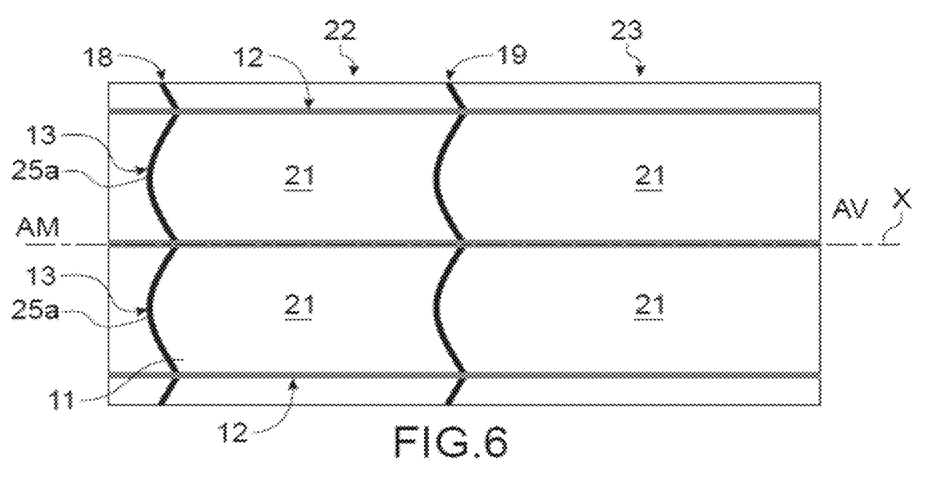
FIG. 6 is a partial and schematic view, radially outwards, of an ejection cone according to one embodiment of the invention.

The first and second partitions 12, 13 extend substantially perpendicularly from the first wall 11 between a radially inner end edge 121, 131, arranged facing the first wall 11, and a radially outer end edge 122, 132 (FIGS. 3 to 5). The first and second partitions 12, 13 are arranged radially outside the first wall 11. The first and second partitions 12, 13 can be made from metal, for example titanium or Inconel®. It is for example Inconel® 625 or Inconel® 718. The first and second partitions 12, 13 can also be made of composite material, especially ceramic matrix composite material. More generally, they can be made with any type of material capable of withstanding temperatures greater than or equal to 450° C.

The first partitions 12 furthermore extend generally in the axial direction and are distributed circumferentially around the first wall 11, especially regularly (FIG. 3). For example, the first partitions 12 are identical in shape and size.

The second partitions 13 extend generally in the circumferential direction between the pairs of adjacent first partitions 12 (FIG. 3). These second partitions 13 are bent partitions, comprising at least one portion arched in the axial direction upstream or downstream, extending in the circumferential direction.

The second partitions 13 are furthermore distributed circumferentially around the annular wall 11, especially regularly, in at least one circumferential row 18, 19, for example two circumferential rows 18, 19 spaced axially apart from each other. The second partitions 13 of the most upstream circumferential row 18 may extend from the first portion 14 of the first wall 11, while the second partitions 13 of the most downstream circumferential row 19 may extend from the second portion 15 of the first wall 11. The second partitions 13 of a same circumferential row 18, 19 are for example identical in shape and dimensions.

The second partitions 13 can be attached, at each of their circumferential ends 20a, to that of the first and second partitions 12, 13 which is circumferentially closer thereto, especially by riveting (FIG. 5). The first and second partitions 12, 13 thus form an integral or one-piece assembly. The circumferential ends 20a of each of the second partitions 13 are for example formed by tabs extending generally axially from a central core 20b of said second partition 13.

Along a circumferential row 18, 19, one or more second partitions 13 may be arranged between each pair of adjacent first partitions 12. Thus, for example, when a single second partition 13 of a circumferential row 18, 19 is arranged between a pair of adjacent first partitions 12, each of its circumferential ends 20a is attached to one of the first partitions 12 of said pair. When two second partitions 13 of a circumferential row 18, 19 are arranged between a pair of adjacent first partitions 12, one of the circumferential ends 20a of said second partitions 13 is attached to one of the first partitions 12 of said pair, and the other circumferential ends 20a thereof are attached to each other.

The first wall 11, the first partitions 12 and the second partitions 13 furthermore define therebetween a plurality of acoustic enclosures 21 distributed around the first wall 11 in at least one circumferential row 22, 23, for example two circumferential rows 22, 23 following one another axially. The acoustic enclosures 21 are especially designed to absorb at least part of the noise generated by the combustion of the gases in the combustion chamber 105, especially low-frequency noise, typically between 300 Hz and 1000 Hz.

Each of the acoustic enclosures 21 is thus bounded radially inwards by the first wall 11, circumferentially by a pair of first partitions 12 and axially by one or more second partitions 13. For example, the acoustic enclosures 21 of the most upstream circumferential row 22 are delimited axially, upstream AM, by one or more second partitions 13 located between said pair of first partitions 12 and belonging to the most upstream circumferential row 18 and, downstream AV, by one or more second partitions 13 located between said pair of first partitions 12 and belonging to the most downstream circumferential row 19. The acoustic enclosures 21 of the most downstream circumferential row 23 are bounded axially upstream AM by the second partitions 13 of the most downstream circumferential row 19. They may furthermore be bounded downstream AV by the first wall 11, especially its second portion 15.

Figure 2:
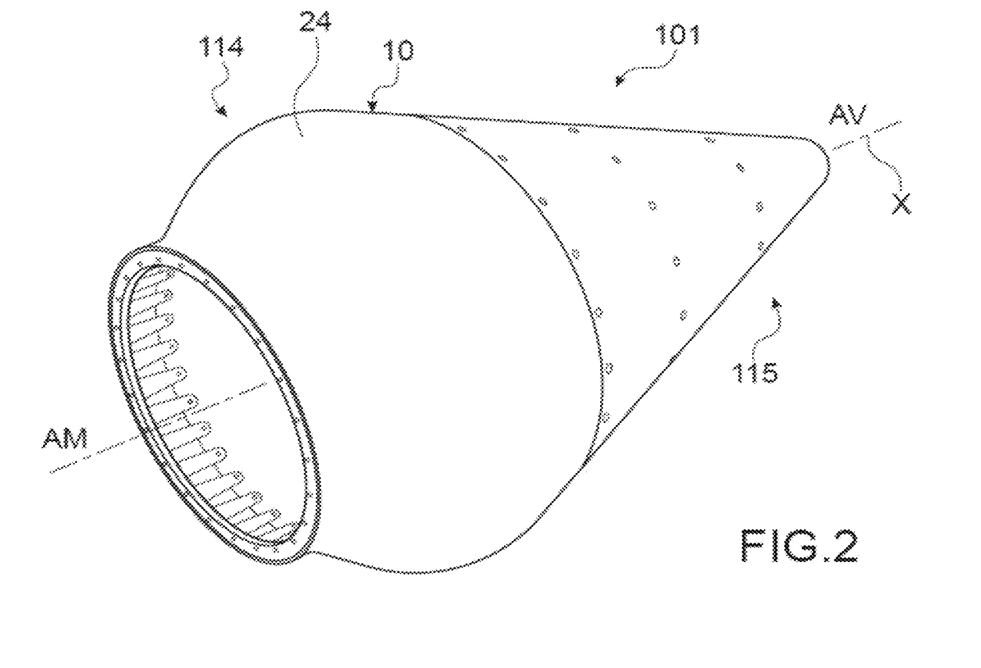
FIG. 2 is a perspective view of the ejection cone illustrated in FIG. 1.

The acoustic enclosures 21 can also be bounded radially outwards by the second wall 24, which is centred on the longitudinal axis X (FIGS. 2 and 4). For example, the second wall 24 joins the first wall 12 downstream of the first partitions 12, especially at the third portion 16 of the first wall 12. The second wall 24 is multi-perforated so as to allow part of the acoustic energy from the primary stream 109 to pass into the acoustic enclosures 21 and thus abate the noise generated by the combustion of the gases in the combustion chamber 105. The second wall 24 is for example attached, downstream, to the conical downstream part 115 of the ejection cone 101. The second wall 24 can be made of a ceramic matrix composite material. More generally, it can be made with any type of material capable of withstanding temperatures of 450° C. or more.

Dimensions and sizing of the first wall 11, the first partitions 12, the second partitions 13 and, if necessary, the second wall 24 are such that the acoustic enclosures 21 have large volumes, especially volumes of between 3000 cm$^3$ and 5000 cm$^3$.

By way of example (FIGS. 4 and 5), a volume V1 of the acoustic enclosures 21 in the most upstream circumferential row 22 is substantially equal to 3710 cm$^3$, while a volume V2 of the acoustic enclosures 21 in the most downstream circumferential row 23 is substantially equal to 4230 cm$^3$. For this, a height H1 of the central core 20b of the second partitions 13 of the most upstream circumferential row 18 is for example between 50 and 60 mm inclusive, especially substantially equal to 55 mm. A height H2 of the central core 20b of the second partitions 13 of the most downstream circumferential row 19 is for example between 110 and 135 mm inclusive, especially substantially equal to 123 mm. By "height", it is meant a dimension of the central core 20b of the second partitions 13, taken perpendicularly to the first wall 11, between their radially inner 131 and outer 132 end edges. A distance D1 between each pair of adjacent first partitions 12, taken at the radially outer end edge 122 of said first partitions 12 and at the most upstream circumferential row 18 of second partitions 13, is for example between 190 and 230 mm, especially substantially equal to 210 mm. A distance D2 between each pair of adjacent first partitions 12, taken at half-height between their radially inner 121 and outer 122 end edges and at the most downstream circumferential row 19 of second partitions 13, is for example between 225 and 275 mm, especially substantially equal to 250 mm. A distance D3, taken in the axial direction, between the most upstream point of the radially outer end edge 132 of the second partitions 13 of the most upstream circumferential row 18 and the most upstream point of the radially outer end edge 132 of the second partitions 13 of the most downstream circumferential row 19, is for example between 110 and 140 mm, especially substantially equal to 124 mm. A distance D4, taken in the axial direction, between the most upstream point of the radially outer end edge 132 of the second partitions 13 of the most upstream circumferential row 18 and the most upstream point of the radially inner end edge 131 of the second partitions 13 of the most downstream circumferential row 19, is for example between 165 and 200 mm, especially substantially equal to 183 mm.

According to a first aspect of the invention, the second partitions 13 are bent partitions comprising at least one portion 25a, 25b arched in the axial direction upstream AM or downstream AV (FIGS. 2 to 11), extending in the circumferential direction. The arched portion or portions 25a, 25b are especially made in the central core 20b of the second partitions 13. This makes it possible on the one hand to limit the stresses induced by thermal expansion in the acoustic enclosures 21, especially in the circumferential direction, for example when the exhaust gases from the turbomachine 100 are at high temperature such as temperatures ranging from 600 to 650° C. This also makes it possible on the other hand to reduce the axial forces exerted on the second partitions 13 due to the pressure of the gases in the acoustic enclosures 21 and which therefore have to be withstood by the acoustic enclosures 21, and thus to improve the mechanical strength of the acoustic enclosures 21.

The arched portions 25a, 25b of the second partitions 13 of each circumferential row 18, 19 especially define a pattern repeating along said circumferential row 18, 19.

According to one embodiment of this first aspect of the invention, the pattern of the arched portions 25a, 25b of the second partitions 13 of at least one of the circumferential rows 18, 19 consists of a portion 25a arched upstream AM or a portion 25b arched downstream AV. Thus, all the arched portions 25a, 25b of the second partitions 13 of said circumferential row 18, 19 are oriented in the same axial direction, upstream AM or downstream AV. In FIGS. 3, 5, 6 and 11, the arched portions 25a of the second partitions 13 of the two circumferential rows 18, 19 are oriented upstream AM.

Figure 7:
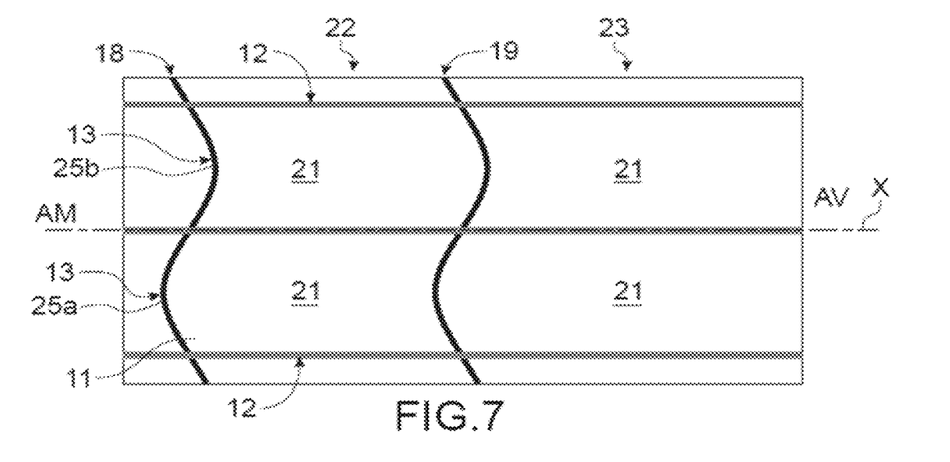
FIG. 7 is a partial and schematic view, radially outwards, of an ejection cone according to one embodiment of the invention.
Figure 8:
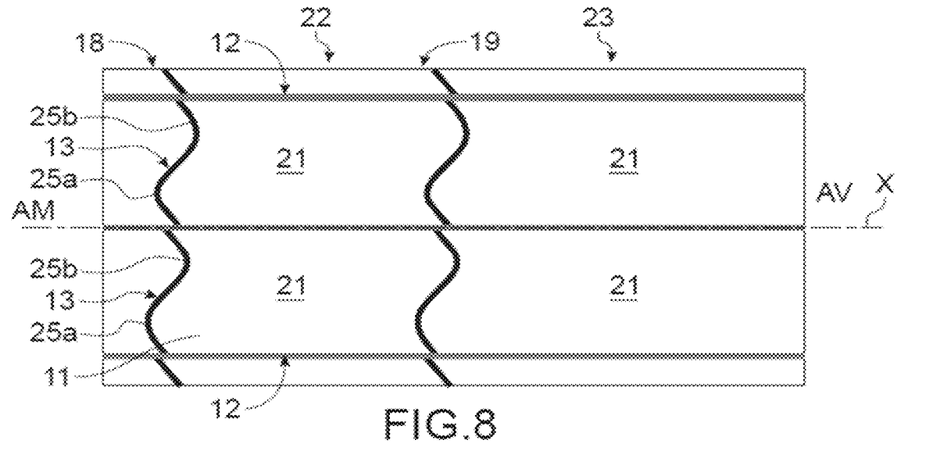
FIG. 8 is a partial and schematic view, radially outwards, of an ejection cone according to one embodiment of the invention.

According to one embodiment of this first aspect of the invention, the pattern of the arched portions 25a, 25b of the second partitions 13 of at least one of the circumferential rows 18, 19 consists of a portion 25a arched upstream AM followed by a portion 25b arched downstream AV, so as to obtain an alternation of a portion 25a arched upstream AM and a portion 25b arched downstream AV all along said circumferential row 18, 19. In FIGS. 7 and 8, the two circumferential rows 18, 19 comprise such an alternation of a portion 25a arched upstream AM and a portion 25b arched downstream AV.

Figure 9:
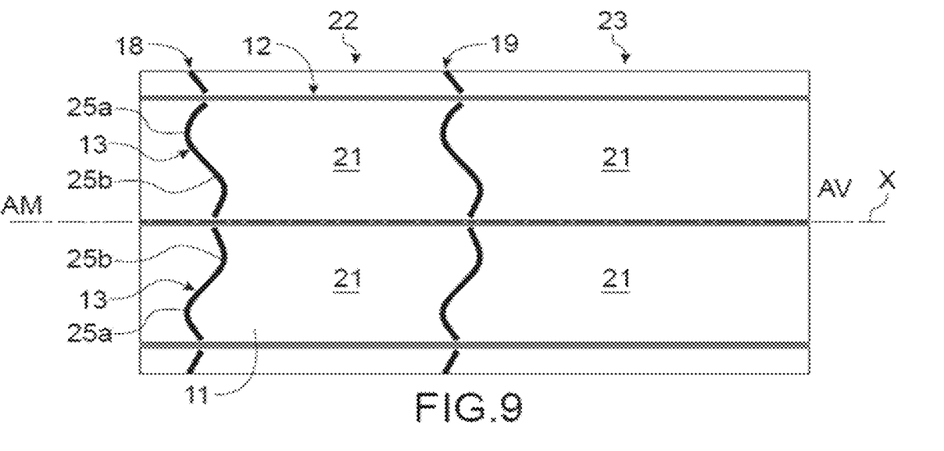
FIG. 9 is a partial and schematic view, radially outwards, of an ejection cone according to one embodiment of the invention.
Figure 10:
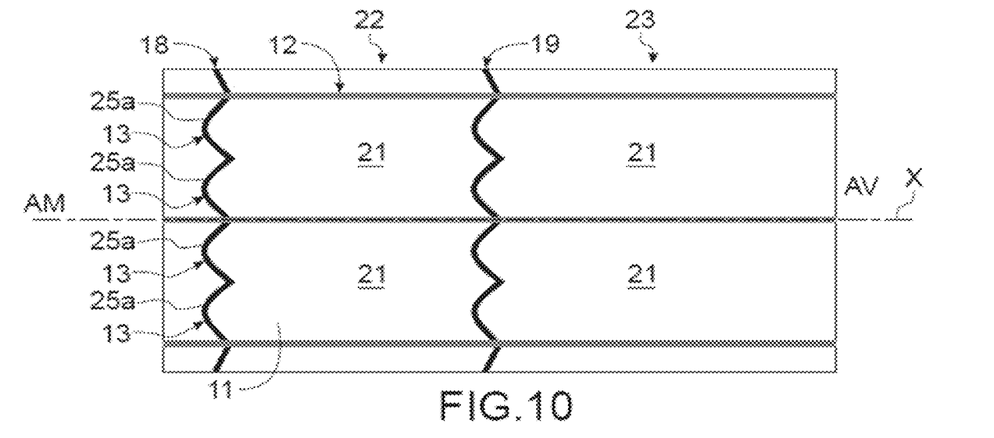
FIG. 10 is a partial and schematic view, radially outwards, of an ejection cone according to one embodiment of the invention.
Figure 11:
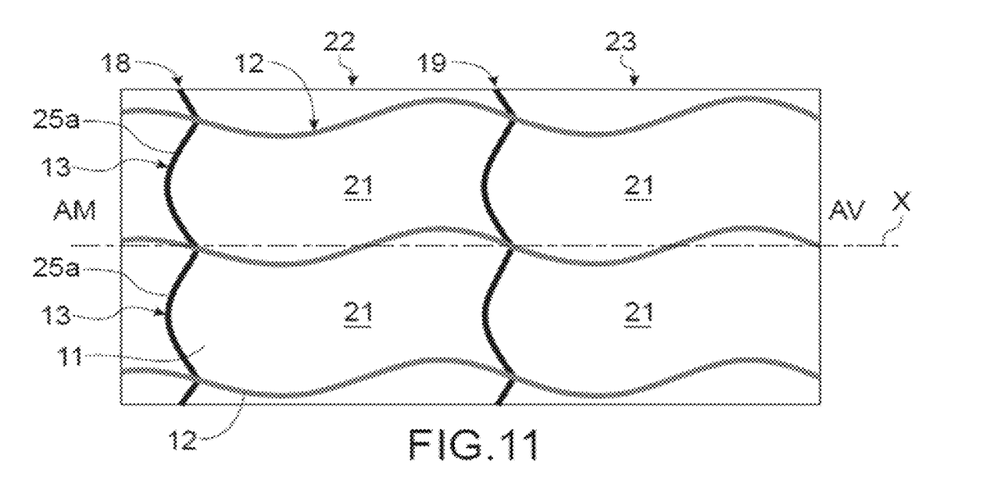
FIG. 11 is a partial and schematic view, radially outwards, of an ejection cone according to one embodiment of the invention.

According to one embodiment of this first aspect of the invention, the pattern of arched portions 25a, 25b of the second partitions 13 of at least one of the circumferential rows 18, 19 consists of two portions 25a arched upstream AM followed by two portions 25b arched downstream AV, so as to obtain an alternation of two portions 25a arched upstream AM and two portions 25b arched downstream AV all along said circumferential row 18, 19. In FIG. 9, the two circumferential rows 18, 19 comprise such an alternation of two portions 25a arched upstream AM and two portions 25b arched downstream AV.

According to one embodiment of this first aspect of the invention, along at least one of the circumferential rows 18, 19, two or more successive arched portions 25a, 25b are interposed between each pair of adjacent first partitions 12. This is the case, for example, of the most upstream circumferential row 18 in FIGS. 3 and 5, where two portions 25a, 25b arched upstream AM are interposed between each pair of adjacent first partitions 12, and of the two circumferential rows 18, 19 in FIG. 10, where two arched portions 25a are oriented in a same axial direction, upstream AM, between each pair of adjacent first partitions 12. For example, this is also the case for the two circumferential rows 18, 19 in FIGS. 8 and 9, where two arched portions 25a, 25b are oriented alternately upstream AM and downstream AV between each pair of adjacent first partitions 12.

According to one embodiment of this first aspect of the invention, each second partition 13 of at least one of the circumferential rows 18, 19 carries a single arched portion 25a, 25b. This is the case, for example, in FIGS. 3, 5, 6, 7, 10 and 11.

According to one embodiment of this first aspect of the invention, each second partition 13 of at least one of the circumferential rows 18, 19 carries a portion 25a arched upstream AM and a portion 25b arched downstream AV. This is the case, for example, in FIGS. 8 and 9.

For example, a distance D5, taken in an axial plane and at the radially outer end edge 132 of each second partition 13, between an apex of the or one of the arched portions 25a, 25b of said second partition 13 and the circumferential ends of the central core 20b of said second partition 13 is greater than or equal to 20 mm (FIG. 5). By "apex", it is meant the point of the radially outer end edge 132 of the second partition 13 which is furthest upstream in the case of a portion 25a arched upstream AM and furthest downstream in the case of a portion arched downstream AV.

Each second partition 13 may also have a transition radius R between each of its circumferential ends 20a and the apex of the arched portion 25a 25b of said second partition 13, adjacent thereto, greater than or equal to 20 mm (FIG. 5).

According to one embodiment of this first aspect of the invention, the first partitions 12 are corrugated in the axial direction. This is the case, for example, in FIG. 11.

Figure 12:
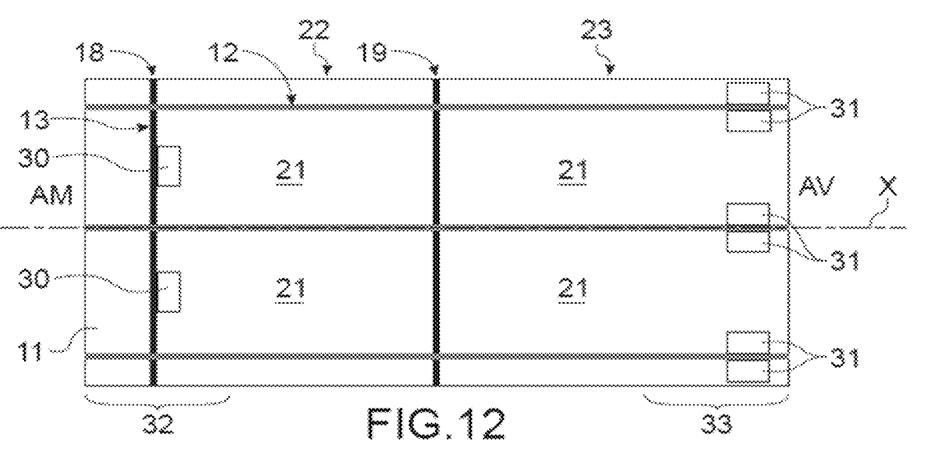
FIG. 12 is a partial and schematic view, radially outwards, of an ejection cone according to one embodiment of the invention.
Figure 13:
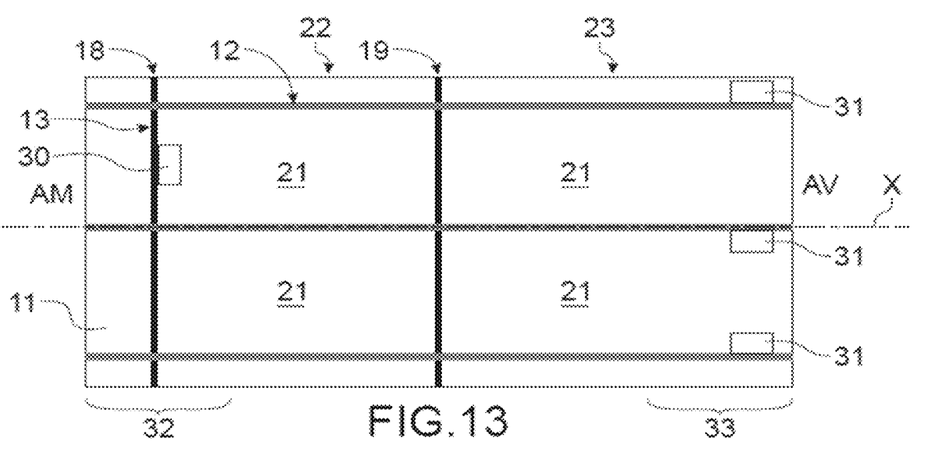
FIG. 13 is a partial and schematic view, radially outwards, of an ejection cone according to one embodiment of the invention.
Figure 14:
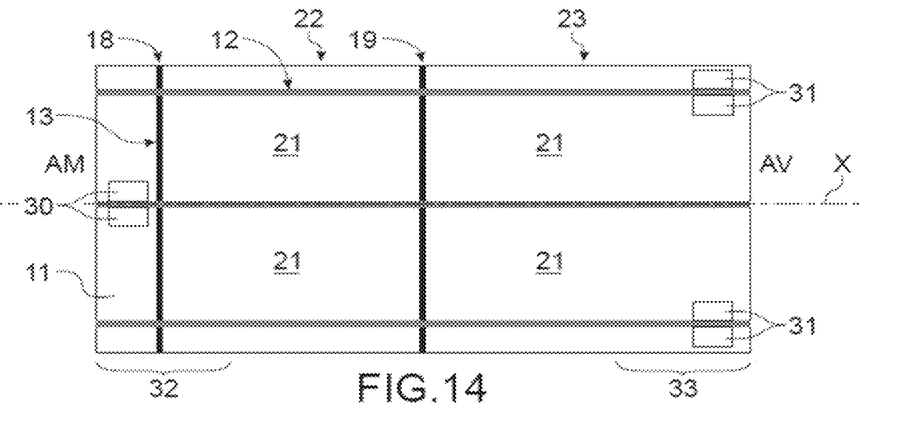
FIG. 14 is a partial and schematic view, radially outwards, of an ejection cone according to one embodiment of the invention.

According to a second aspect of the invention, which may or may not be combined with the first aspect and which is illustrated in FIGS. 12 to 14, the assembly formed by the first and second partitions 12, 13 is arranged on the first wall 11 by means of first attachment members 30 arranged upstream and second attachment members 31 arranged downstream. The first and second attachment members 30, 31 form mechanical point connections, such as fittings. Furthermore, the first attachment members 30 are circumferentially offset relative to the second attachment members 31. The first attachment members 30 and the second attachment members 31 are thus misaligned in the axial direction. It is understood here that the set 10 has no other means for attaching the first and second partitions 12, 13 to the first wall 11. In this way, the first partitions 12 can only be attached to the first wall 11 either upstream or downstream, but not both, which allows the first partitions 12 to expand freely, especially in the axial direction. This enables the mechanical strength of the acoustic enclosures 21 to be improved.

The first attachment members 30 are mounted between first and/or second partitions 12, 13 and an upstream portion 32 of the first wall 11. The upstream portion 32 is for example formed in the first portion 14 of the first wall 11. The first attachment members 30 may furthermore be generally circumferentially aligned with one another.

The second attachment members 31 are mounted between first and/or second partitions 12, 13 and a downstream portion 33 of the first wall 11. The downstream portion 33 is for example formed in the second portion 15 of the first wall 11. The second attachment members 31 may furthermore be generally circumferentially aligned with one another.

Each first partition 12 is for example mounted to the first wall 11, either upstream by one or more first attachment members 30, or downstream by one or more second attachment members 31. In other words, first or second attachment members 30, 31 are for example mounted between each first partition 12 and the first wall 11. In FIGS. 12 and 13, each first partition 12 is mounted to the first wall 11 by means of one or two second attachment members 31. In FIG. 14, the first partitions 12 are alternately mounted to the first wall 11 upstream by means of two first attachment members 30 and downstream by means of two second attachment members 31.

According to one embodiment of this second aspect of the invention, the first attachment members 30 are mounted between second partitions 13 of the most upstream circumferential row 18 and the upstream portion 32 of the first wall 11. This is the case, for example, with the first attachment members 30 in FIGS. 12 and 13. The first attachment members 30 can furthermore be mounted on one side only, especially on the downstream side, as is the case in FIGS. 12 and 13, of said second partitions 13 in the axial direction. Each first attachment member 30 may also be separated from the first attachment members 30 which are circumferentially adjacent thereto, by one or two first partitions 12. In FIG. 12, a first attachment member 30 is arranged in each acoustic enclosure 21 of the most upstream circumferential row 22. In FIG. 13, a first attachment member 30 is arranged in every second acoustic enclosure 21 of the most upstream circumferential row 22.

Alternatively, the first attachment members 30 are mounted between first partitions 12 and the upstream portion 32 of the first wall 11, especially upstream of the circumferential rows 18, 19 of second partitions 13. This is the case, for example, with the first attachment members 30 *i*, FIG. 14. Of course, in this case, no other second attachment member 31 can be mounted between said first partitions 12 and the downstream portion 33 of the first wall 11. The first attachment members 30 can furthermore be mounted on each side of said first partitions 12 in the circumferential direction.

According to one embodiment of this second aspect of the invention, the second attachment members 31 are mounted between first partitions 12 and the downstream portion 33 of the first wall 11, especially downstream of the circumferential rows 18, 19 of second partitions 13. This is the case, for example, in FIGS. 12 to 14. The second attachment members 31 can be mounted on either side of said first partitions 12 in the circumferential direction. This is the case, for example, with the second attachments 31 in FIGS. 12 and 14. Alternatively, each second attachment member 31 is mounted on only one side of said first partitions 12 in the circumferential direction, especially facing another second attachment member 31. The second attachment members 31 can thus be arranged in every second acoustic enclosure 21 or more of the most downstream circumferential row 23. This is the case, for example, with the second attachment members 31 in FIG. 13.

The invention claimed is:

1. A set for an ejection cone of an aircraft turbomachine, comprising:
    a first annular wall centered on a longitudinal axis of axial direction oriented from upstream to downstream, and
    a plurality of first partitions and second partitions extending substantially perpendicularly from the first annular wall,
    wherein the first partitions extend generally in the axial direction and are distributed circumferentially around the first annular wall,
    wherein the second partitions extend generally in a circumferential direction between pairs of adjacent first partitions and are distributed circumferentially around the first annular wall in at least one circumferential row,
    wherein the first annular wall, the first partitions and the second partitions define therebetween a plurality of acoustic enclosures distributed around the first annular wall,
    wherein the second partitions are bent walls comprising at least one portion arched in the axial direction upstream or downstream,
    wherein an assembly formed by the first and second partitions is attached to the first annular wall with first attachment members arranged upstream and second attachment members arranged downstream, and
    wherein the first attachment members are offset circumferentially relative to the second attachment members.

2. The set according to claim 1, wherein the arched portions of the second partitions of at least one of the circumferential rows define a pattern repeating along said circumferential row and wherein the pattern of the arched portions of the second partitions of said circumferential row consists of a portion arched upstream or downstream, such that all the arched portions of the second partitions of said circumferential row are oriented in a same axial direction, upstream or downstream.

3. The set according to claim 1, wherein the arched portions of the second partitions of at least one of the circumferential rows define a pattern repeating along said circumferential row and wherein the pattern of the arched portions of the second partitions of said circumferential row consists of a portion arched upstream followed by a portion arched downstream, so as to obtain an alternation of a portion arched upstream and a portion arched downstream all along said circumferential row.

4. The set according to claim 1, wherein the arched portions of the second partitions of at least one of the circumferential rows define a pattern repeating along said circumferential row and wherein the pattern of the arched portions of the second partitions of said circumferential row consists of two portions arched upstream followed by two portions arched downstream, so as to obtain an alternation of two portions arched upstream and two portions arched downstream all along said circumferential row.

5. The set according to claim 1, wherein, along at least one of the circumferential rows, two or more successive arched portions are interposed between each pair of adjacent first partitions.

6. The set according to claim 1, wherein each second partition of at least one of the circumferential rows carries a single arched portion.

7. The set according to claim 1, wherein each second partition of at least one of the circumferential rows carries a portion arched upstream and a portion arched downstream.

8. An ejection cone for an aircraft turbomachine comprising the set according to claim 1.

9. An aircraft turbomachine, comprising the ejection cone according to claim 8.

* * * * *